F. G. RAVENKAMP.
KEROSENE OIL HEATING STOVE.
APPLICATION FILED AUG. 7, 1916.
1,227,930.
Patented May 29, 1917.
2 SHEETS—SHEET 2.
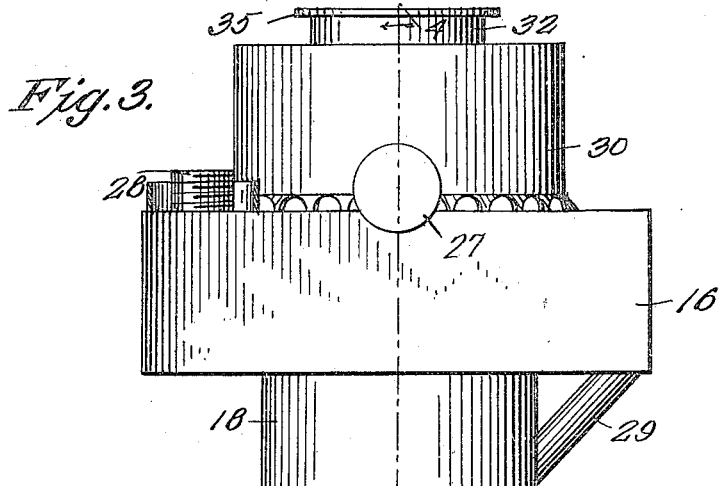
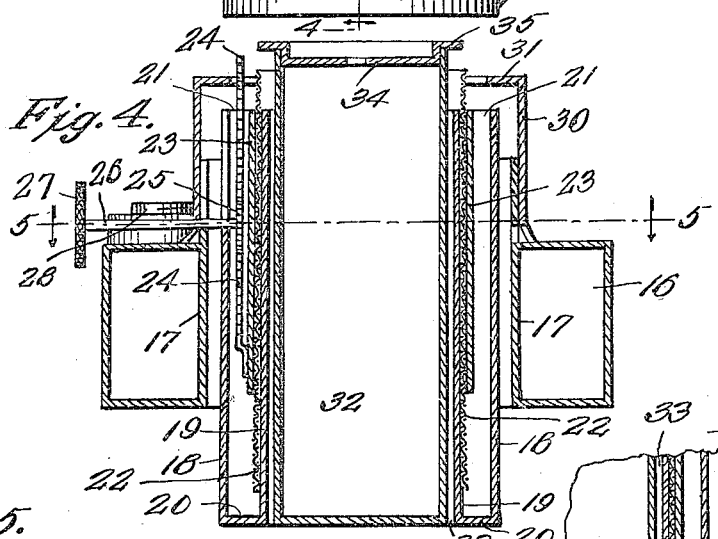
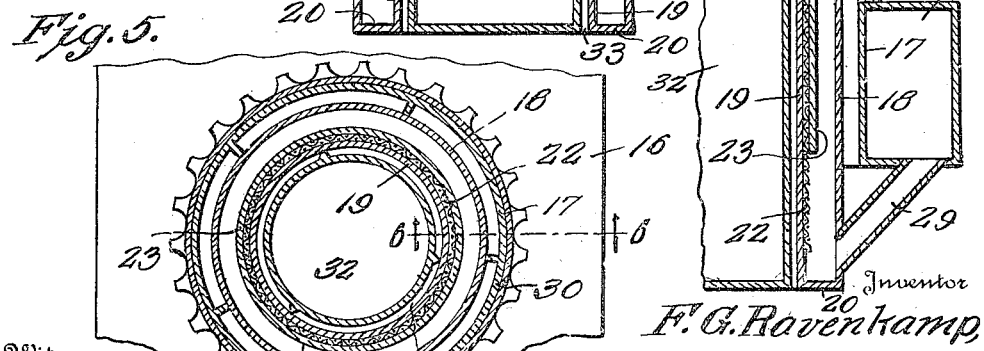
Inventor
F. G. Ravenkamp,

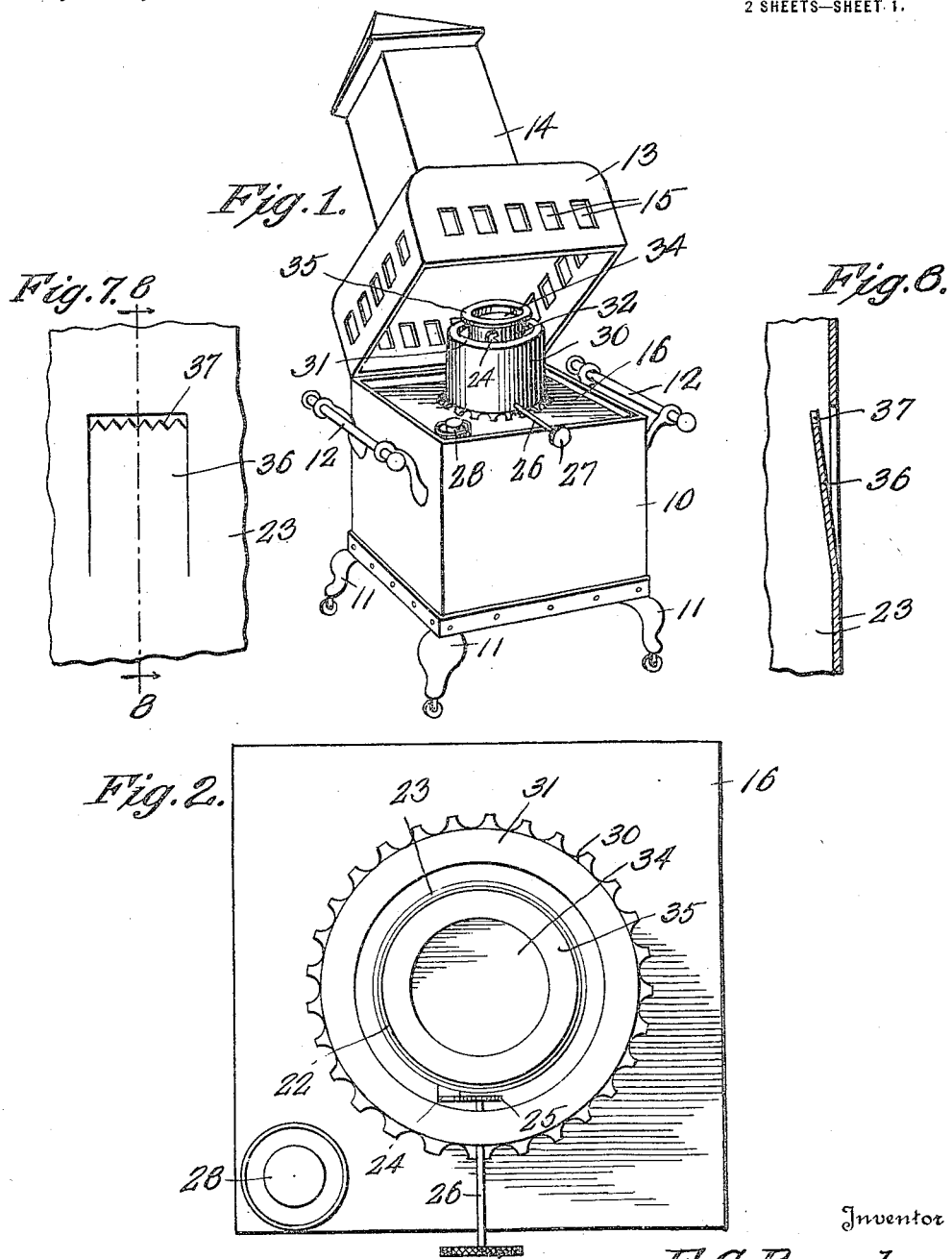

UNITED STATES PATENT OFFICE.

FERDINAND G. RAVENKAMP, OF SPEARVILLE, KANSAS.

KEROSENE-OIL HEATING-STOVE.

1,227,930.　　　　　　　Specification of Letters Patent.　　Patented May 29, 1917.

Application filed August 7, 1916.　Serial No. 113,636.

*To all whom it may concern:*

Be it known that I, FERDINAND G. RAVENKAMP, a citizen of the United States, residing at Spearville, in the county of Fork, State of Kansas, have invented certain new and useful Improvements in Kerosene-Oil Heating-Stoves; and I do hereby declare the following to be a full, clear, and exact description of the invention, such as will enable others skilled in the art to which it appertains to make and use the same.

This invention relates to oil heating stoves and has special reference to an improved form of burner for use on stoves of this character.

The principal object of this invention is to provide an improved and simplified form of stove which will be practically smokeless in operation and in which the air for combustion will be fed to the wick in an improved and novel manner so that the wick will be supplied with air both interiorly and exteriorly, the interior air being directed against the side of the burning portion of the wick when the latter is lighted.

Another important object of the invention is to provide means for cooling the ascending current of air on the inside of the wick.

A third important object of the invention is to provide an improved form of burner wherein a water reservoir is provided centrally of the burner.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a perspective view of a stove constructed in accordance with this invention.

Fig. 2 is a plan view of the reservoir and burner removed from the stove.

Fig. 3 is a side elevation of said reservoir and burner.

Fig. 4 is a section on the line 4—4 of Fig. 3.

Fig. 5 is a section on the line 5—5 of Fig. 4.

Fig. 6 is a section on the line 6—6 of Fig. 5.

Fig. 7 is a detail view of the inside of the wick carrier tube.

Fig. 8 is a section on the line 8—8 of Fig. 7.

In carrying out the objects of this invention there is provided a stove casing 10 supported on the usual legs 11 and this bottom is provided with the carrying handles 12 of any desired form. Hinged to the top of the casing 10 is a cover 13 provided with a chimney 14, the sides of the cover being provided with a plurality of air openings 15 therein.

The burner and reservoir are clearly seen in the detail figures, and in this burner and reservoir construction there is provided a reservoir 16 having a rectangular outside wall which fits within the casing 10 while the inner wall 17 of this reservoir is circular so as to provide a circular opening. Within the reservoir is a burner which consists of an annular casing having an outer wall 18 and an inner wall 19. This casing projects below and above the reservoir 16 and the outer wall 18 is in spaced relation to the inner wall 17 of the reservoir. The casing is closed at the bottom as indicated at 20 and open at the top as indicated at 21.

At 22 is indicated a wick which is slidable on the inner wall 19 and surrounding this wick is a wick carrier tube 23 to which is connected a rack bar 24, the rack being engaged by a pinion 25 fixed on the stem 26 of an adjusting shaft provided with a knurled head 27. By this means the sleeve 23 may be raised or lowered as desired.

In order to supply oil to the reservoir 16 there is provided the usual filling nozzle 28 and leading from the reservoir to the bottom of the casing containing the wick is a pipe or tube 29 so that oil can flow from the reservoir through the casing and rise to the same height as the oil in the reservoir. Thus there is always kept in the casing a sufficient amount of oil to wet the lower end of the wick so long as any oil remains in the reservoir.

On the top inner edge of the reservoir 16 there is provided an upstanding flange 30 which terminates just below the top of the wick when the latter is in position for burning. Projecting inwardly from the flange 30 is a flange 31 which is directed toward the wick just below the top thereof and terminates short of the wick so that a central opening is formed with which the wick is concentric. By reason of the fact that the outer wall 18 is spaced from the inner wall 17 the air will flow up between these walls and striking the flange 31 will be deflected inward against the burning portion of the wick.

Located centrally within the burner is a water reservoir 32 which has its walls spaced from the wall 19 so that an air space 33 is formed between said walls through which air can flow upward, this air space being within the wick as clearly shown in Fig. 4.

This water reservoir projects above the flange 31 and fitted in the top thereof is a closure 34. The upper edge of the closure 34 is provided with an outwardly directed flange 35 which extends substantially to the inner line of the wick and constitutes a flame spreader. By means of this peculiar arrangement air flowing up through the passage between the walls 17 and 18 and the air flowing up through the passage 33 strikes on opposite sides of the wick at the point where it is burning and thus supplies sufficient air to the combustible to prevent any smoking and to prevent the flame from touching the flange 35 since the upflowing air through the passage 33 forces the flames slightly outward.

For the purpose of engaging the wick the member 23 is provided with tongues 36 having serrated edges 37 engaging the material of the wick.

Furthermore this construction is such that the oil within the wick casing is kept cool and it has been found by practice under these conditions that the use of a chimney is unnecessary since the distribution of the air current is such as to produce substantially perfect combustion without such chimney. Thereby the difficulty attendant in keeping chimneys clean and in replacement of broken chimneys is entirely eliminated.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In an oil stove, a reservoir, having a central circular opening, a burner located centrally of the reservoir and projecting at its upper end above the reservoir, a connection between the burner and reservoir, an upstanding flange positioned on the inner edge of the top of the reservoir and having an inwardly directed flange at its upper edge to provide an opening concentric with the burner, said upstanding flange being provided with a horizontal row of air openings immediately above the reservoir, the edge of said opening being spaced from and below the top of the wick when the latter is in position for burning when turned up, said burner being in spaced relation to the reservoir whereby an air passage is provided between the burner and reservoir and the inwardly directed flange serves to direct the upflowing air current against the top of the wick.

2. In an oil stove, a reservoir having a central circular opening, a burner located centrally of the reservoir and projecting at its upper end above the reservoir, a connection between the burner and reservoir, an upstanding flange positioned on the inner edge of the top of the reservoir and having an inwardly directed flange at its upper edge to provide an opening concentric with the burner, said upstanding flange being provided with a horizontal row of air openings immediately above the reservoir, the edge of said opening being spaced from and below the top of the wick when the latter is turned up in position for burning, said burner being in spaced relation to the reservoir whereby an air passage is provided between the burner and reservoir and the inwardly directed flange serves to direct the upflowing air current against the top of the wick, and a central water receptacle arranged in spaced relation within the burner and provided with a closure cap having an outwardly projecting flange constituting a flame spreader.

In testimony whereof, I affix my signature, in the presence of two witnesses.

FERDINAND G. RAVENKAMP.

Witnesses:
W. J. HERMAN,
GEO. F. RAVENKAMP.

Copies of this patent may be obtained for five cents each, by addressing the "Commissioner of Patents, Washington, D. C."